(12) United States Patent
Loevenguth et al.

(10) Patent No.: US 10,552,815 B2
(45) Date of Patent: Feb. 4, 2020

(54) SECURE CONTACTLESS PAYMENT SYSTEMS AND METHODS

(71) Applicant: The Western Union Company, Englewood, CO (US)

(72) Inventors: Rebecca Loevenguth, Denver, CO (US); Evans Mehew, Larkspur, CO (US); Dave Owen, Castle Rock, CO (US); Dianna Lyons, Highlands Ranch, CO (US); Scott Paintin, Littleton, CO (US)

(73) Assignee: The Western Union Company, Denver, CO (US)

( * ) Notice: Subject to any disclaimer, the term of this patent is extended or adjusted under 35 U.S.C. 154(b) by 0 days.

(21) Appl. No.: 15/330,810

(22) Filed: Nov. 7, 2016

(65) Prior Publication Data
US 2017/0148008 A1    May 25, 2017

Related U.S. Application Data

(63) Continuation of application No. 12/978,704, filed on Dec. 27, 2010, now Pat. No. 9,489,669.

(51) Int. Cl.
*G06Q 20/20* (2012.01)
*G06Q 20/32* (2012.01)
(Continued)

(52) U.S. Cl.
CPC ........... *G06Q 20/206* (2013.01); *G06Q 20/20* (2013.01); *G06Q 20/204* (2013.01);
(Continued)

(58) Field of Classification Search
USPC .......................................................... 705/17
See application file for complete search history.

(56) References Cited

U.S. PATENT DOCUMENTS 5,854,581 A * 12/1998 Mori ...................... G06Q 20/10
                                                          235/379
6,219,439 B1    4/2001 Burger
(Continued)

FOREIGN PATENT DOCUMENTS

WO       0241236        5/2002
WO       2004053640     6/2004
(Continued)

*Primary Examiner* — Luna Champagne
(74) *Attorney, Agent, or Firm* — Kilpatrick Townsend & Stockton LLP

(57) ABSTRACT

According to the invention, a system for providing payments to a point of sale device is disclosed. The system may include a mobile device having a storage medium, an input device, a wireless transmission device, and a processor. The storage medium may include individual authentication information and device authentication information. The input device may be configured to receive an input. The wireless transmission device may be configured to selectively transmit the device authentication information to a nearby point of sale device. The processor may be configured to compare the input with the individual authentication information, and activate the wireless transmission device to transmit the device authentication information if the input is correlated with the individual authentication information.

11 Claims, 5 Drawing Sheets

(51) Int. Cl.
   *G06Q 20/40* (2012.01)
   *H04L 29/06* (2006.01)
   *H04W 12/06* (2009.01)

(52) U.S. Cl.
   CPC ....... *G06Q 20/327* (2013.01); *G06Q 20/3278* (2013.01); *G06Q 20/4014* (2013.01); *H04L 63/0876* (2013.01); *H04W 12/06* (2013.01)

(56) References Cited

U.S. PATENT DOCUMENTS

| | | | |
|---|---|---|---|
| 6,934,689 | B1 | 8/2005 | Ritter |
| 7,231,202 | B2 * | 6/2007 | Natsuno ................ G06K 7/084 235/380 |
| 7,286,691 | B1 | 10/2007 | Modi |
| 7,478,065 | B1 | 1/2009 | Ritter |
| 7,478,068 | B2 | 1/2009 | Maritzen |
| 7,494,058 | B2 | 2/2009 | Bonalle |
| 7,512,567 | B2 | 3/2009 | Bemmel |
| 7,530,493 | B2 | 5/2009 | Bonalle |
| 7,543,156 | B2 | 6/2009 | Campisi |
| 7,587,756 | B2 | 9/2009 | Peart |
| 7,597,250 | B2 | 10/2009 | Finn |
| 7,690,032 | B1 | 3/2010 | Peirce |
| 7,715,593 | B1 | 5/2010 | Peirce |
| 7,748,636 | B2 | 7/2010 | Finn |
| 7,766,223 | B1 * | 8/2010 | Mello ................ G06Q 20/32 235/379 |
| 8,655,310 | B1 * | 2/2014 | Katzer .............. H04M 1/72519 455/410 |
| 2002/0184500 | A1 | 12/2002 | Maritzen |
| 2003/0167207 | A1 | 9/2003 | Berardi |
| 2003/0182194 | A1 * | 9/2003 | Choey ................ G06Q 20/04 705/16 |
| 2003/0226041 | A1 | 12/2003 | Palmer |
| 2004/0005051 | A1 | 1/2004 | Wheeler |
| 2004/0049451 | A1 | 3/2004 | Berardi |
| 2004/0177045 | A1 | 9/2004 | Brown |
| 2004/0188519 | A1 | 9/2004 | Cassone |
| 2004/0240592 | A1 | 12/2004 | Meyer et al. |
| 2005/0010796 | A1 | 1/2005 | Amouse |
| 2005/0269402 | A1 | 12/2005 | Spitzer |
| 2006/0043169 | A1 | 3/2006 | Haertel |
| 2006/0235796 | A1 | 10/2006 | Johnson et al. |
| 2007/0118745 | A1 | 5/2007 | Buer |
| 2007/0136573 | A1 * | 6/2007 | Steinberg ................ G06F 21/32 713/155 |
| 2007/0198286 | A1 * | 8/2007 | Tomita .................... G06F 21/32 713/182 |
| 2007/0214093 | A1 * | 9/2007 | Colella ................ G06Q 20/04 705/67 |
| 2007/0245158 | A1 | 10/2007 | Giobbi |
| 2007/0257100 | A1 | 11/2007 | Chase-Salerno |
| 2007/0288759 | A1 | 12/2007 | Wood |
| 2007/0291995 | A1 | 12/2007 | Rivera |
| 2008/0005578 | A1 | 1/2008 | Shafir |
| 2008/0040274 | A1 * | 2/2008 | Uzo ...................... G06Q 20/40 705/44 |
| 2008/0040284 | A1 | 2/2008 | Hazel |
| 2008/0082452 | A1 | 4/2008 | Wankmueller |
| 2008/0103972 | A1 | 5/2008 | Lanc |
| 2008/0126260 | A1 | 5/2008 | Cox |
| 2008/0223925 | A1 | 9/2008 | Saito |
| 2009/0070583 | A1 | 3/2009 | Von Muller |
| 2009/0095810 | A1 | 4/2009 | Cannon |
| 2009/0140839 | A1 | 6/2009 | Bishop |
| 2009/0143104 | A1 | 6/2009 | Loh |
| 2009/0145972 | A1 | 6/2009 | Evans |
| 2009/0159663 | A1 | 6/2009 | Mullen |
| 2009/0171851 | A1 | 7/2009 | Beenau |
| 2009/0201128 | A1 | 8/2009 | Campisi |
| 2009/0224035 | A1 | 9/2009 | Deborgies |
| 2009/0271322 | A1 | 10/2009 | Lay |
| 2009/0281945 | A1 | 11/2009 | Shakkarwar |
| 2009/0307139 | A1 | 12/2009 | Mardikar |
| 2009/0322477 | A1 | 12/2009 | Celorio |
| 2009/0325542 | A1 | 12/2009 | Wentker et al. |
| 2010/0049987 | A1 | 2/2010 | Ettorre |
| 2010/0198728 | A1 * | 8/2010 | Aabye ................ G06Q 20/32 705/44 |
| 2011/0022517 | A1 * | 1/2011 | Hammad ................ G06Q 20/12 705/44 |
| 2011/0251892 | A1 * | 10/2011 | Laracey ............. G06Q 30/0253 705/14.51 |
| 2012/0030110 | A1 | 2/2012 | Prakash et al. |

FOREIGN PATENT DOCUMENTS

| | | |
|---|---|---|
| WO | 2007133542 | 11/2007 |
| WO | 2009079394 | 6/2009 |
| WO | 2009148980 | 12/2009 |
| WO | 2010043722 | 4/2010 |

* cited by examiner

SECURE CONTACTLESS PAYMENT SYSTEMS AND METHODS

CROSS-REFERENCE TO RELATED APPLICATIONS

This application is a continuation of U.S. patent application Ser. No. 12/978,704, filed Dec. 27, 2010, and entitled, "SECURE CONTACTLESS PAYMENT SYSTEMS AND METHODS," the entire disclosure of which is hereby incorporated by reference, for all purposes, as if fully set forth herein.

BACKGROUND OF THE INVENTION

This invention relates generally to payments with mobile devices. More specifically the invention relates to verifying that both users and mobile devices, which attempt to use account information for transactions, are authorized to do so.

In recent years the number of different types of electronic payment at the point of sale (or other transactions) has increased dramatically. As the number of ways a consumer could initiate a payment for purchases has increased, so has the sophistication of criminal elements which aim to steal this new, often wirelessly transmitted, payment information as it makes its way from consumer to merchant.

While some enhanced security methods have been introduced to combat such fraud, these methods typically do not determine whether a source of payment information is authorized to provide that payment information. Instead, only the validity of the information itself is checked. Embodiments of the present invention provide solutions to these shortcomings and other problems with current electronic transactions.

BRIEF DESCRIPTION OF THE INVENTION

In one embodiment, a system for approving, at a server, a payment request received from a mobile device at a point of sale device, the point of sale device remote from the server, is provided. The system may include a server, a point of sale device, and a mobile device. The server may be configured to store device authentication data, where the authentication data correlates particular authentication information with particular mobile devices. The server may also be configured to store account data. The server may further be configured to receive a device authentication request, where the device authentication request includes device authentication information and device identification information. The server may additionally be configured to evaluate the device authentication request based at least in part on a first comparison of the device authentication information and device identification information with at least a portion of the device authentication data. The server may furthermore be configured to receive a payment request, where the payment request includes account information. The server may moreover be configured to evaluate the payment request based at least in part on a second comparison of the account information with at least a portion of the account data. The server may also be configured to approve the payment request based on the first comparison and the second comparison. The point of sale device may be remote from the server, and may be configured to receive device authentication information and device identification information. The point of sale device may also be configured to transmit the device authentication request including the device authentication information and the device identification information. The point of sale device may further be configured to transmit the payment request including account information. The mobile device may be configured to transmit, wirelessly, the device authentication information, where the device authentication information is associated with the mobile device. The mobile device may also be configured to provide account information.

In another embodiment, a system for approving, at a point of sale device and/or a server, a payment request received from a mobile device is provided. The system may include a point of sale device configured to receive and evaluate various information. The point of sale device may be configured to receive transaction information. The point of sale device may also be configured to receive device authentication information from a mobile device, wirelessly, where the device authentication information is associated with the mobile device. The point of sale device may be further configured to evaluate the device authentication information. The point of sale device may be additionally configured to receive account information from the mobile device. The point of sale device may be furthermore configured to determine whether to transmit a payment request based at least in part on the evaluation of the device authentication information, where the characteristics of the payment request are based at least in part on the transaction information and the account information.

In another embodiment, a system for providing payments to a point of sale device is provided. The system may include a mobile device having a storage medium, an input device, a wireless transmission device, and a processor. The storage medium may include individual authentication information and device authentication information. The input device may be configured to receive an input. The wireless transmission device may be configured to selectively transmit the device authentication information to a nearby point of sale device. The processor may be configured to compare the input with the individual authentication information, and activate the wireless transmission device to transmit the device authentication information if the input is correlated with the individual authentication information.

BRIEF DESCRIPTION OF THE DRAWINGS

The present invention is described in conjunction with the appended figures.

Figure 1:
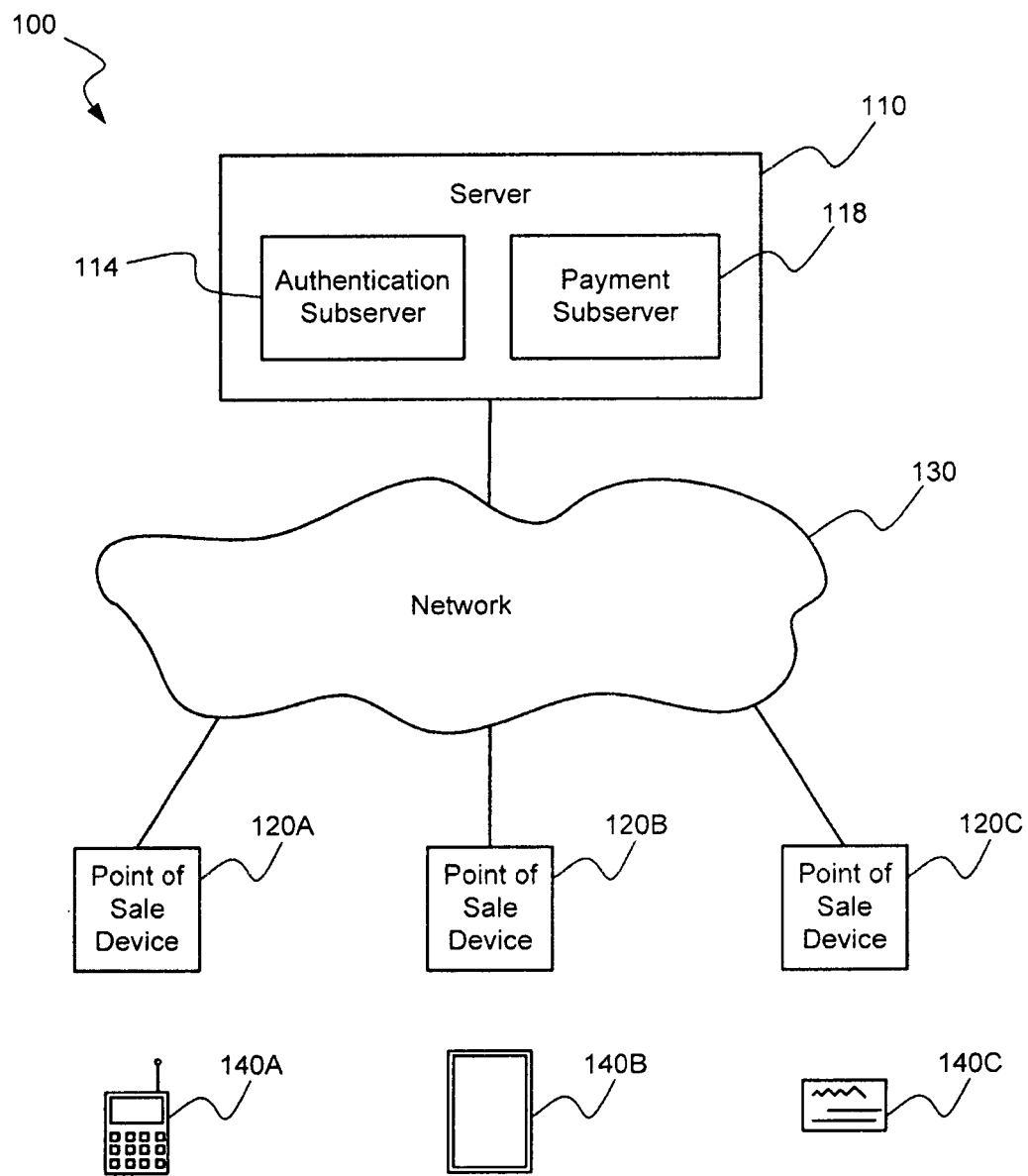
FIG. 1 is a block diagram of a system of the invention for approving payment requests.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment of the invention, a system for approving, at a server, a payment request received from a mobile device at a point of sale device, the point of sale device remote from the server, is provided. The system may include a server, a point of sale device, and a mobile device. The number of servers, point of sale devices, and mobile devices is scalable to meet the requirements of any size system.

The server may include one or more centralized computer systems. The server may be in communication with the point of sale devices via wide area networks and/or the local area networks. A point of sale device may include any computer, register, credit/debit/stored-value card reader, and/or any other device at a location where an agent, or other person with authority to use or access server resources, desires to accept payments from persons with mobile devices. Mobile devices may include, merely by way of example, credit cards, debit cards, prepaid cards, gift cards, smart cards, mobile phones, tablet computers, notebook and laptop computers, fobs, etc. In some embodiments, mobile devices will be any device that can be carried by a person which is able to perform the functions described herein. "Wireless" communication methods described herein may also be referred to as "contactless" communications.

The server may be configured to store device authentication data, where the device authentication data correlates particular authentication information with particular mobile devices. Merely by way of example, authentication data may correlate a certain authenticating value with device identification data. In this fashion, when a certain authenticating value is known, the corresponding device can be ascertained via the device identification data, and vice-versa. Also, if both an authentication value and a device identification value are received, it can be verified if they are proper because the same corresponding values should be stored by the server.

The server may also be configured to store account data. Account data may include information necessary to identify a particular financial account. In some embodiments this account data may be stored together with, or separately from, the device authentication data and device identification data. In some embodiments, account data may be correlated with device authentication data and/or device identification data, thereby linking certain account information with certain mobile devices. In some embodiments, account data may include two or more account identifiers associated with any particular mobile device. An account or accounts associated with a mobile device may also be associated with the user and/or owner of the mobile device.

The server may further be configured to receive a device authentication request, where the device authentication request includes device authentication information and device identification information. The server may additionally be configured to evaluate the device authentication request based at least in part on a first comparison of the device authentication information and device identification information with at least a portion of the device authentication data. As described above, this may allow the server to determine if the device authentication information and the device identification information received in the device authentication request are properly correlated, per the device authentication data stored at the server, and therefore representative of an authorized mobile device.

The server may furthermore be configured to receive a payment request, where the payment request includes account information. The server may moreover be configured to evaluate the payment request based at least in part on a second comparison of the account information with at least a portion of the account data. The second comparison may determine, merely by way of example, if there are sufficient funds in the financial account to cover the payment request; if the payment request is of a type, possibly based on geography, merchant, merchant type, or other criteria, for which the account is approved to conduct transactions; if the payment request passes a fraudulent use check; and/or if other types of typical determinations are made when approving a funds transfer.

Finally, the server may also be configured to approve the payment request based on the first comparison and the second comparison. In some embodiments, the server may not make the second comparison if the first comparison is unfavorable. In other embodiments, the second comparison may instead be done first, and if the payment transaction is potentially authorized, the first comparison may be made as a final check regarding the approval of the transaction. In either case, the other comparison may not be conducted if the first-in-time comparison is unfavorable.

When the server determines that either one or both of the first comparison and the second comparison are unfavorable, the server may also be configured to transmit an unauthorized use message to the point of sale device. The same or similar message may also be sent to a fraudulent use system configured to track such activity. Note that in some embodiments the server may include a device authentication server to conduct the first comparison and a payment server to conduct the second comparison.

In some embodiments, the device authentication request may include biometric information of a user of the mobile device. In these or other embodiments, the device authentication request may include a password, or other password-like information, submitted by the user of the mobile device. In the above or other embodiments, the device authentication information may also include device authentication information that is dynamic as a function of time, where the portion of device authentication data at the server related to that mobile device is also dynamic as a function of time, but yet is always correlated to the same dynamically changing device authentication information. In any of these embodiments, the server can verify such provided device authentication information via the device authentication data stored at the server (or in communication with the server). Another dynamic method of changing device authentication information may be where a list of sequential device authentication information is provided to any required component of the system, and as each transaction occurs, a pointer/flag identifies the next sequential device authentication information used for the subsequent transaction.

In some embodiments the server may also be configured to determine whether to transmit a secondary verification message based at least on the characteristics of the payment request. This may be done because the payment request is for a different type than specified as being a usual type by the mobile device user at enrollment or thereafter. Merely by way of example, the user, at enrollment, may desire the server to conduct secondary verification on any transaction outside a specific geographic area, outside a certain period of the day (for example, late at night), of a different type (for example, service versus goods purchase), and/or over a certain amount.

The server may be configured, when necessary, to transmit the secondary verification message to the mobile device and receive a secondary response message to the mobile device. The server can then evaluate the payment request based at least in part on the secondary response message. As above, the secondary response message can include biometric, password, and/or other information submitted by the mobile device user and verifiable by the server according to prerecorded data.

The point of sale device may be remote from the server, perhaps at a merchant or service provider location, and may be configured to receive device authentication information and device identification information from a mobile device. The point of sale device may also be configured to transmit the device authentication request, including the device authentication information and the device identification information, to the server. The point of sale device may further be configured to transmit the payment request, which may include account information, to the server.

In other embodiments, the point of sale device may conduct the first comparison (of the device authentication information and device identification information with the device authentication data), rather than the server as described above. In these embodiments, the point of sale device may have access to the device authentication data to conduct such comparison. In some embodiments, the device authentication information may need to be received contemporaneously with the payment request for the first comparison to be favorable. In these or other embodiments, the point of sale device may also be configured not to transmit the payment request to the server unless the first comparison is favorable.

In some embodiments, where the mobile device itself conducts the first comparison, as will be discussed below, the point of sale device may be configured to receive an unauthorized use message from the mobile device. This will inform the point of sale device that a payment request should not be submitted to the server.

The mobile device may be configured to transmit, wirelessly, the device authentication information, where the device authentication information is associated with the mobile device. In some embodiments, the device authentication information may be one or more of information stored on the mobile device and information entered into an input portion of the mobile device. In these or other embodiments, the device authentication information may be self authenticating to the point of sale device and/or the server. That being the case when the mobile device itself conducts a check of input received from the user of the mobile device against information stored on the device or elsewhere. This input may, merely by way of example, be biometric or password-type information. Additionally, the device authentication information may be transmitted for a limited duration and/or distance to avoid detection by rogue entities. Merely by an example, the device authentication information may only be transmitted for 5, 10, 15, 30, or 60 seconds. This allows for verification that payment/account information is received in the same duration as the device authentication information, thereby enhancing security of the transaction The mobile device may also be configured to provide account information to the point of sale device. In various embodiments this may be provided via traditional methods of magnetic stripe and reader, or may be provided using wireless communication technologies.

In another embodiment of the invention, a system for approving, at a point of sale device, a payment request received from a mobile device is provided. The system may include a point of sale device configured to receive and evaluate various information. The point of sale device may be configured to receive transaction information.

The point of sale device may also be configured to receive device authentication information from a mobile device, wirelessly, where the device authentication information is associated with the mobile device. The point of sale device may be further configured to evaluate the device authentication information. The point of sale device may be additionally configured to receive account information from the mobile device.

The point of sale device may be furthermore configured to determine whether to transmit a payment request based at least in part on the evaluation of the device authentication information, where the characteristics of the payment request are based at least in part on the transaction information and the account information.

In another embodiment of the invention, a system for providing payments to a point of sale device is provided. The system may include a mobile device having a storage medium, an input device, a wireless transmission device, and a processor.

The storage medium may include individual authentication information and device authentication information. In some embodiments the storage medium may also include account information.

The input device may be configured to receive an input. In some embodiments the input device may include a biometric input device, and the individual authentication information may include biometric information of an authorized user of the mobile device.

The wireless transmission device may be configured to selectively transmit the device authentication information to a nearby point of sale device. In some embodiments, the wireless transmission device may be further configured to selectively transmit the device authentication information concurrently with the account information. In this manner, the point of sale device may be assisting in authorizing the transaction by knowing that such information should be received concurrently, or at least contemporaneously.

The processor may be configured to compare the input with the individual authentication information, and activate the wireless transmission device to transmit the device authentication information if the input is correlated with the individual authentication information.

In some embodiments, the wireless transmission device may be further configured to selectively transmit an unauthorized use message to the nearby point of sale device. In these embodiments, the processor may be further configured to activate the wireless transmission device to transmit the unauthorized use message if the input is not correlated with the individual authentication information. In some embodiments, activation of the wireless transmission device may be limited in duration (for example, 5, 10, 15, 30, or 60 seconds). In some of these or other embodiments, the wireless transmission device may be further configured to selectively transmit a biometric input received at the input device to the nearby point of sale device. The processor may then be further configured to activate the wireless transmission device to transmit the biometric input if the input is not correlated with the individual authentication information.

In some embodiments the wireless device may be configured to detect possible or actual hostile scans. For example, a possible hostile scan may be detected by the mobile device and/or server when the mobile device establishes a connection with a dumber of devices that is greater in quantity than the total point of sale devices associated with a particular location. Information regarding these scans such as geography, duration, and scanning device identification information may be recorded by the mobile device and transmitted to the next point of sale device communicated with by the mobile device, and/or directly transmitted to the server.

Turning now to FIG. 1, a block diagram of a system 100 of the invention, as described above, for approving payment requests is shown. System 100 may include server 110. Server 110 may include a device authentication subserver 114 and a payment subserver 118. Each subserver 114, 118 may include at least one processor and storage medium (not shown).

Server 110 may be in communication with a plurality of point of sale devices 120 via network 130. Each point of sale device 120 may include a processor and a storage medium (not shown). Each point of sale device may also include the subsystems necessary to transmit and receive information from the server 110 and mobile devices 130, either via wired or wireless communications.

Each mobile device 140 may include a processor, storage medium, and wireless transmission device. Each mobile device 140 may also include other means of communication, including but not limited to magnetic stripes, radio frequency identifiers (RFID), GSM, TDMA, CDMA, and near field communications modules.

Note that many mobile devices 140 of system 100 may have different capabilities. As shown in FIG. 1, mobile device 140A may be a mobile phone, mobile device 140B may be a tablet computer, and mobile device 140C may be a smart card, with each mobile device 140 having different capabilities. However, in many embodiments, each mobile device 140 will be capable of wireless transmitting the device authentication information to the point of sale devices 120.

Figure 2:
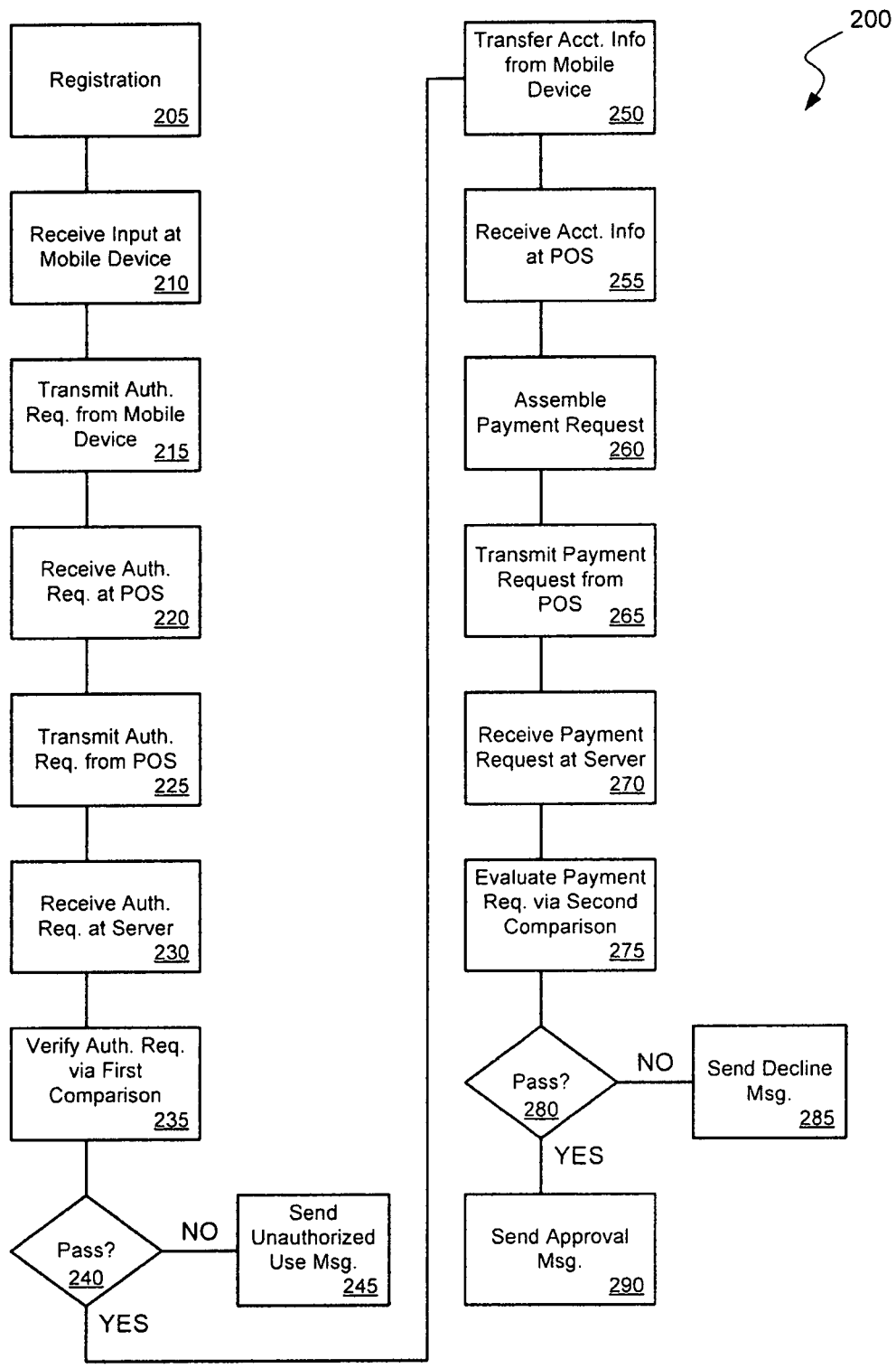
FIG. 2 is a block diagram of a method of the invention for approving payment requests.

FIG. 2 shows a block diagram of a method 200 of the invention for approving payment requests. In method 200, the server is responsible for authenticating the mobile device.

At block 205, the user and/or mobile device of the user is registered for the service. Registration may include specifying, by the user, temporal, geographic, and/or types of merchants/service providers for which transactions will be allowed, or which will be allowed with various levels of security as described herein (for example, merely first comparison of authentication data, or secondary verifications). Registration may also include determining the extent of information reach of the authentication system. For example, in some embodiments the authentication may employ, at the mobile device, the point of sale device, and/or the server, the user's calendar, possibly located on the mobile device to match geography and/or merchant locations to allowable transactions.

At block 210, an input is received at a mobile device. This input indicates that the user of the mobile device would like to initiate a payment and beings the authorization process. As discussed above, the input may be biometric, password-related, or may merely be a Boolean entry (for example, YES or NO).

At block 215, an authorization request, including the input, is transmitted from the mobile device. At block 220, the authorization request is received by the point of sale device.

At block 225, the authorization request is transmitted from the point of sale device. At block 230, the authorization request is received by the server.

At block 235, the server makes a first comparison of at least a portion of the device authentication information in the authorization request to device authentication data accessible to the server. This may include evaluating the payment authorization request in relation to any limits set by the user during or following registration. At block 240, if the comparison is not favorable, an unauthorized use message is transmitted from the server to the point of sale device at block 245. The point of sale device may also transmit this to the mobile device. In some embodiments, the point of sale device may disable itself upon receipt of the unauthorized use message. In some embodiments, the mobile device may be disabled after one or more failed attempts to use the mobile device. Disablement of the mobile device may involved one or more point of sale devices, the server, and/or a communications network or some portion thereof (e.g., tower or WiFi node). Disablement of the mobile device can occur after the first or second comparison being not favorable.

If at block 240 the comparison is favorable, at block 250 account information is transferred from the mobile device to the point of sale device. At block 255, the account information is received by the point of sale device. Note that in many embodiments, the account information and authentication request will be received from the point of sale device at the mobile device contemporaneously.

At block 260, the point of sale device may assemble a payment request. This payment request may include merchant/service provider account information, transaction information, and account information provided from the mobile device. At block 265, the payment request may be transmitted from the point of sale device to the server. At block 270, the payment request may be received by the server.

At block 275, the server evaluates the payment request via the second comparison. At block 280, if the comparison is not favorable, perhaps because the account does not have sufficient funds, a declination message is sent from the server to the point of sale device at block 285. If instead at block 280 the second comparison is favorable, an approval message may be sent from the server to the point of sale device at block 290. Note that in many embodiments, the first comparison at block 235 and the second comparison at block 275 may be conducted relatively sequentially by the server when both the authentication request and the payment request is received by the server prior to such comparisons being initiated.

Figure 3:
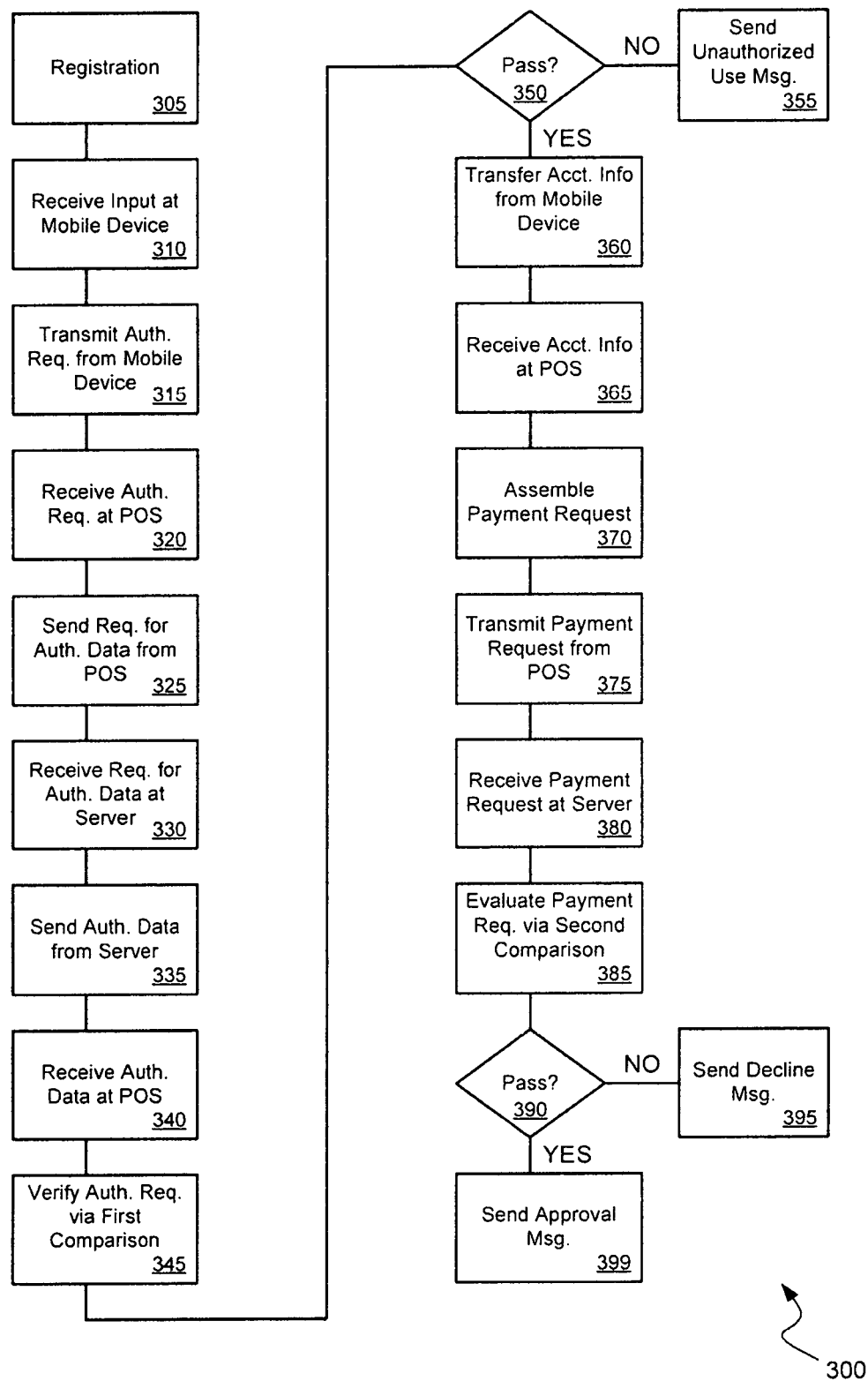
FIG. 3 is a block diagram of another method of the invention for approving payment requests.

FIG. 3 shows a block diagram of another method 300 of the invention for approving payment requests. In method 300, the point of sale device is responsible for authenticating the mobile device.

At block 305, the user and/or mobile device of the user is registered for the service. At block 310, an input is received at a mobile device.

At block 315, an authorization request, including the input, is transmitted from the mobile device. At block 320, the authorization request is received by the point of sale device.

At block 325, a request for authorization data is transmitted from the point of sale device. At block 330, the request for authorization data is received by the server.

At block 335, the server sends authorization data to the point of sale device. At block 340, the point of sale device received the authorization data.

At block 345, the point of sale device makes a first comparison of at least a portion of the device authentication information in the authorization request to device authentication data accessible to the server. This may include evaluating the payment authorization request in relation to any limits set by the user during registration. At block 350, if the comparison is not favorable, an unauthorized use message is transmitted from the point of sale device to the mobile device at block 355. In some embodiments, the point of sale device may disable itself upon receipt of the unauthorized use message. Alternatively, or in addition, the mobile device may be disabled following the first or the second comparison being not favorable.

If at block 350 the comparison is favorable, at block 360 account information is transferred from the mobile device to the point of sale device. At block 365, the account information is received by the point of sale device. Note that in many embodiments, the account information and authentication request will be received from the point of sale device at the mobile device contemporaneously.

At block 370, the point of sale device may assemble a payment request. This payment request may include merchant/service provider account information, transaction information, and account information provided from the mobile device. At block 375, the payment request may be transmitted from the point of sale device to the server. At block 380, the payment request may be received by the server.

At block 385, the server evaluates the payment request via the second comparison. At block 390, if the comparison is not favorable, perhaps because the account does not have sufficient funds, a declination message is sent from the server to the point of sale device at block 395. If instead at block 390 the second comparison is favorable, an approval message may be sent from the server to the point of sale device at block 399.

Figure 4:
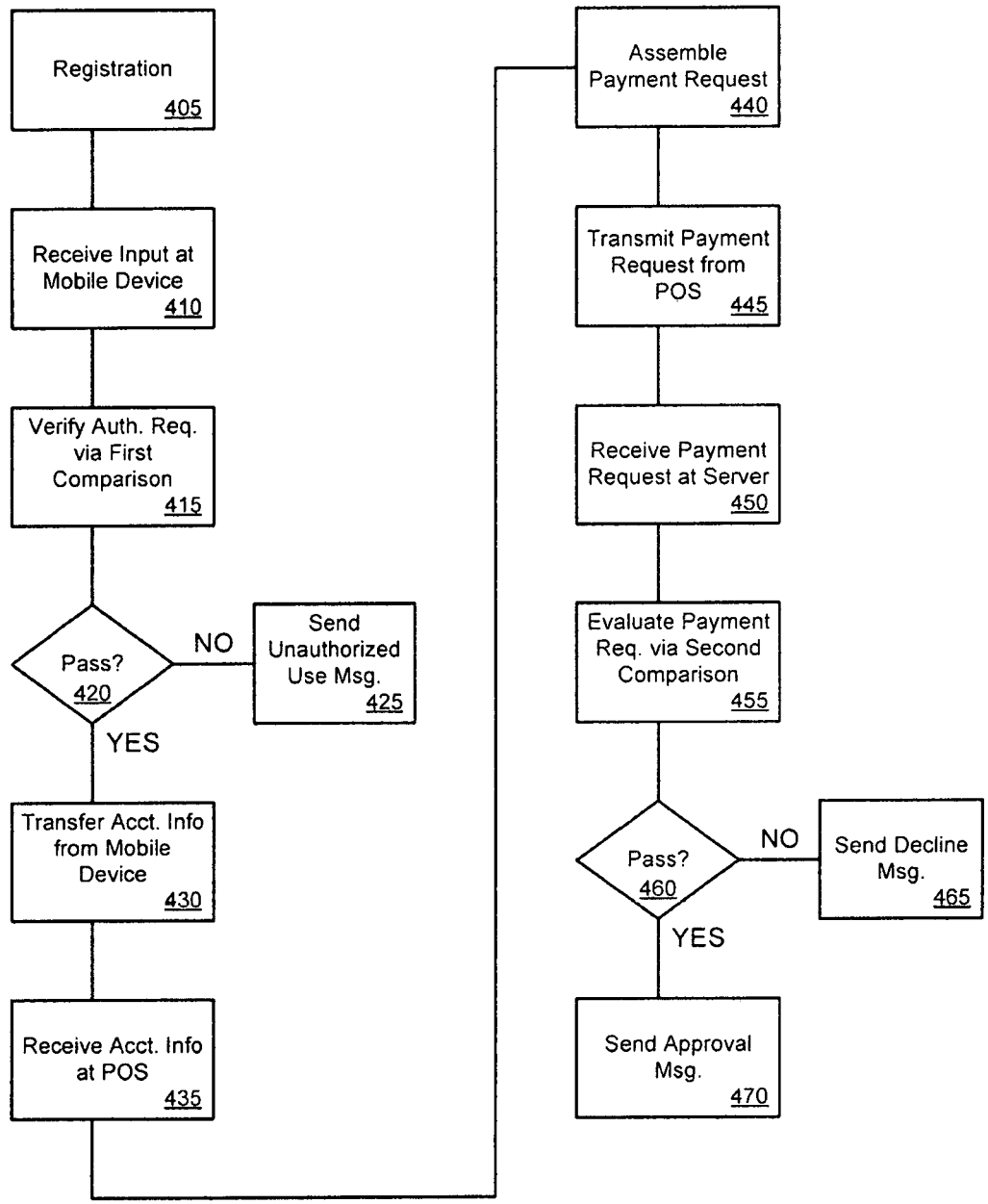
FIG. 4 is a block diagram of yet another method of the invention for approving payment requests.

FIG. 4 shows a block diagram of yet another method 400 of the invention for approving payment requests. In method 400, the mobile device is responsible for self authentication.

At block 405, the user and/or mobile device of the user is registered for the service. At block 410, an input is received at a mobile device.

At block 415, the mobile device makes a first comparison of at least a portion of the input to device authentication data accessible to the mobile device, either locally or remotely, possibly at the server. This may include evaluating the payment authorization request in relation to any limits set by the user during registration (with such limits being stored either locally, or remotely, possibly at the server). At block 420, if the comparison is not favorable, an unauthorized use message is transmitted from the mobile device to the point of sale device at block 425. In some embodiments, the point of sale device may send a fraud alert message to other systems. In some embodiments, the mobile device may also disable itself upon an unfavorable comparison at block 420.

If at block 420 the comparison is favorable, at block 430 account information is transferred from the mobile device to the point of sale device. At block 435, the account information is received by the point of sale device.

At block 440, the point of sale device may assemble a payment request. This payment request may include merchant/service provider account information, transaction information, and account information provided from the mobile device. At block 445, the payment request may be transmitted from the point of sale device to the server. At block 450, the payment request may be received by the server.

At block 455, the server evaluates the payment request via the second comparison. At block 460, if the comparison is not favorable, perhaps because the account does not have sufficient funds, a declination message is sent from the server to the point of sale device at block 465. If instead at block 460 the second comparison is favorable, an approval message may be sent from the server to the point of sale device at block 470.

Figure 5:
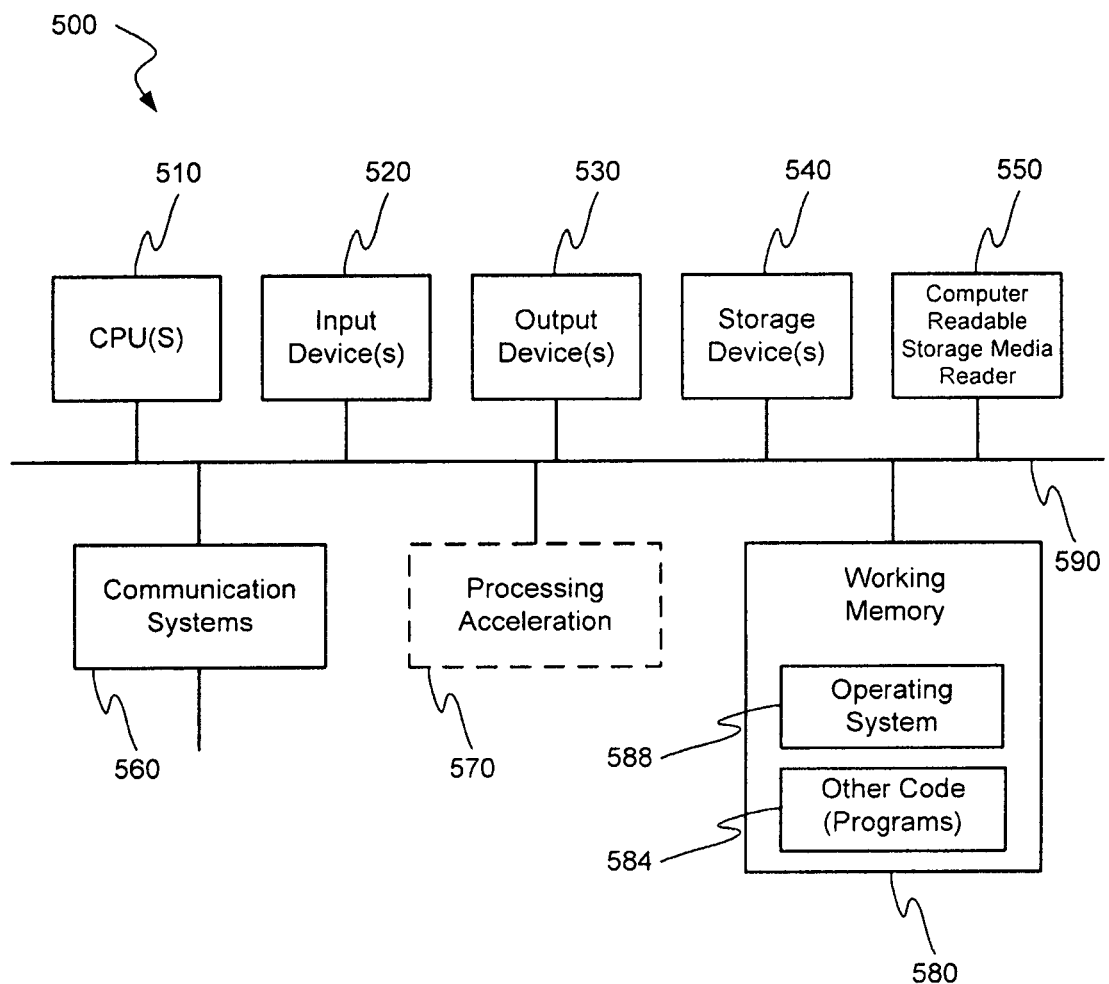
FIG. 5 is a block diagram of an exemplary computer system capable of being used in at least some portion of systems of the present invention, or implementing at least some portion of the methods of the present invention.

FIG. 5 is a block diagram illustrating an exemplary computer system 500 in which embodiments of the present invention may be implemented. This example illustrates a computer system 500 such as may be used, in whole, in part, or with various modifications, to provide the functions of the server, the point of sale device, the mobile device, and/or other components of the invention such as those discussed above. For example, various functions of the server may be controlled by the computer system 500, including, merely by way of example, conducting first comparisons of device authentication information, conducting second comparisons of payment information, instructing point of sale devices regarding approval or denial of transaction, etc.

The computer system 500 is shown including hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also include software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of the server, the point of sale device, the mobile device, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A system comprising:
 a server configured to:
  receive a device authentication request from a remote mobile device, wherein the device authentication request comprises user authentication information and a mobile device ID of the remote mobile device, wherein the device authentication request is associated with a payment request;
  perform a first comparison to determine whether the user authentication information is correlated with the mobile device ID in a device authentication table;
  receive account information from the remote mobile device, wherein the account information is associated with the payment request, the account information including location data associated with the payment request;
  determine a positive result of the first comparison, and in response to the positive result of the first comparison, perform a second comparison to determine whether the account information is correlated with account data associated with the remote mobile device, wherein the account data comprises one or more geographic area identifiers
  determine that the account information is not correlated with one or more parts of the account data and in response to determining that the account information is not correlated with one or more parts of the account data:
   transmit a secondary authentication request to the remote mobile device;
   in response to transmitting the secondary authentication request, receive secondary authentication information comprising biometric information captured by the remote mobile device;
   perform a third comparison to determine whether the received biometric information is correlated with stored biometric information within the account data;
   determine that the received biometric information is not correlated with the stored biometric information within the account data, and in response to determining that the received biometric information is not correlated with the stored biometric information within the account data:
    deny the payment request from the remote mobile device; and
    send an unauthorized use message to a remote point of sale device in contactless communication with the remote mobile device, wherein in response to the unauthorized use message, the remote point of sale device sends a disablement message to the remote mobile device causing the remote mobile device to disable itself.

2. The system of claim 1, wherein the server is further configured to:
 store the device authentication table.

3. The system of claim 1, wherein receiving the device authentication request from the remote mobile device comprises:

receiving the device authentication request from the remote mobile device via the remote point of sale device in contactless communication with the remote mobile device.

4. The system of claim 1, wherein at least a portion of the user authentication information or at least a portion of the mobile device ID are:
dynamic as a function of time; and
correlated to each other irrespective of time.

5. A method comprising:
receiving from a remote mobile device, with one or more processors, a device authentication request, wherein the device authentication request comprises user authentication information and a mobile device ID of the remote mobile device, wherein the device authentication request is associated with a payment request;
performing a first comparison to determine whether the user authentication information is correlated with the mobile device ID in a device authentication table;
receiving account information from the remote mobile device, wherein the account information is associated with the payment request, the account information including location data associated with the payment request;
determining a positive result of the first comparison, and in response to the positive result of the first comparison, performing a second comparison to determine whether the account information is correlated with account data associated with the remote mobile device, wherein the account data comprises one or more geographic area identifiers;
determining that the account information is not correlated with one or more parts of the account data and in response to determining that the account information is not correlated with one or more parts of the account data:
transmitting a secondary authentication request to the remote mobile device;
in response to transmitting the secondary authentication request, receiving secondary authentication information comprising biometric information captured by the remote mobile device;
performing a third comparison to determine whether the received biometric information is correlated with stored biometric information within the account data;
determining that the received biometric information is not correlated with the stored biometric information within the account data, and in response to determining that the received biometric information is not correlated with the stored biometric information with the account data:
denying the payment request from the remote mobile device; and
sending, from the one or more processors, an unauthorized use message to a remote point of sale device in contactless communication with the remote mobile device, wherein in response to the unauthorized use message, the remote point of sale device sends a disablement message to the remote mobile device causing the remote mobile device to disable itself.

6. The method of claim 5, wherein the method further comprises:
storing the device authentication table.

7. The method of claim 5, wherein receiving the device authentication request from the remote mobile device comprises:
receiving the device authentication request from the remote mobile device via the remote point of sale device in contactless communication with the remote mobile device.

8. The method of claim 5, wherein at least a portion of the user authentication information or at least a portion of the mobile device ID are:
dynamic as a function of time; and
correlated to each other irrespective of time.

9. A non-transitory computer readable medium having instructions stored thereon, the instructions executable by one or more processors to at least:
receive from a remote mobile device a device authentication request, wherein the device authentication request comprises user authentication information and a mobile device ID of the remote mobile device, wherein the device authentication request is associated with a payment request;
perform a first comparison to determine whether the user authentication information is correlated with the mobile device ID in a device authentication table;
receive account information from the remote mobile device, wherein the account information is associated with the payment request, the account information including location data associated with the payment request;
determine a positive result of the first comparison, and in response to the positive result of the first comparison, perform a second comparison to determine whether the account information is correlated with account data associated with the remote mobile device, wherein the account data comprises one or more geographic area identifiers;
determine that the account information is not correlated with one or more parts of the account data and in response to determining that the account information is not correlated with one or more parts of the account data:
transmit a secondary authentication request to the remote mobile device;
in response to transmitting the secondary authentication request, receive secondary authentication information comprising biometric information captured by the remote mobile device;
perform a third comparison to determine whether the received biometric information is correlated with stored biometric information within the account data;
determine that the received biometric information is not correlated with the stored biometric information within the account data, and in response to determining that the received biometric information is not correlated with the stored biometric information within the account data:
deny the payment request from the remote mobile device; and
send an unauthorized use message to a remote point of sale device in contactless communication with the remote mobile device, wherein in response to the unauthorized use message, the remote point of sale device sends a disablement message to the remote mobile device causing the remote mobile device to disable itself.

10. The non-transitory computer readable medium of claim 9, wherein receiving the device authentication request from the remote mobile device comprises:
  receive the device authentication request from the remote mobile device via the remote point of sale device in contactless communication with the remote mobile device.

11. The non-transitory computer readable medium of claim 9, wherein at least a portion of the user authentication information or at least a portion of the mobile device ID are:
  dynamic as a function of time; and
  correlated to each other irrespective of time.

\* \* \* \* \*